(12) United States Patent
Song et al.

(10) Patent No.: US 10,014,012 B1
(45) Date of Patent: Jul. 3, 2018

(54) SPIN-ORBIT TORQUE BASED MAGNETIC RECORDING

(71) Applicant: Western Digital Technologies, Inc., San Jose, CA (US)

(72) Inventors: Suping Song, Fremont, CA (US); Zhanjie Li, Pleasanton, CA (US); Michael Kuok San Ho, Redwood City, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/631,878

(22) Filed: Jun. 23, 2017

(51) Int. Cl.
*G11B 5/31* (2006.01)
*G11B 5/127* (2006.01)

(52) U.S. Cl.
CPC ............ *G11B 5/315* (2013.01); *G11B 5/1278* (2013.01); *G11B 5/3133* (2013.01)

(58) Field of Classification Search
CPC ...... G11B 5/1278; G11B 5/3133; G11B 5/315
USPC ....................................................... 360/125.3
See application file for complete search history.

(56) References Cited

U.S. PATENT DOCUMENTS

| | | | |
|---|---|---|---|
| 8,238,059 B1 | 8/2012 | Tang et al. | |
| 8,295,006 B2 | 10/2012 | Sugano et al. | |
| 8,611,046 B2 | 12/2013 | Wu et al. | |
| 9,196,271 B1 | 11/2015 | Shirotori et al. | |
| 9,230,571 B1 | 1/2016 | Chen et al. | |
| 9,305,583 B1 | 4/2016 | Zhang et al. | |
| 9,311,934 B1 | 4/2016 | Shiimoto et al. | |
| 9,355,654 B1 | 5/2016 | Mallary | |
| 9,361,912 B1 | 6/2016 | Liu et al. | |
| 9,390,734 B2* | 7/2016 | Gao | G11B 5/35 |
| 9,466,319 B1 | 10/2016 | Tang et al. | |
| 2008/0232001 A1 | 9/2008 | Bonhote et al. | |
| 2008/0278861 A1 | 11/2008 | Jiang et al. | |
| 2010/0061014 A1* | 3/2010 | Das | G11B 5/374 360/112 |
| 2014/0226239 A1* | 8/2014 | Mihajlovic | H01L 43/06 360/112 |
| 2015/0077883 A1* | 3/2015 | Kudo | G11B 5/314 360/324.11 |

(Continued)

OTHER PUBLICATIONS

Song, et al.; Micromagnetic Analysis of Adjacent Track Erasure of Wrapped-Around Shielded PMR Writers; IEEE Transactions on Magnetics; vol. 45, No. 10; dated Nov. 10, 2009; 10 total pages.

(Continued)

*Primary Examiner* — Jefferson Evans
(74) *Attorney, Agent, or Firm* — Patterson & Sheridan, LLP; Steven Versteeg

(57) ABSTRACT

The present disclosure generally relates to data storage devices, and more specifically, to a magnetic media drive employing a magnetic recording head. The head includes a main pole, a spin-torque structure surrounding at least a portion of the main pole at a media facing surface (MFS), and a spin Hall structure surrounding the spin-torque structure. Strong spin-orbit torque (SOT) is generated from the spin Hall structure, enforcing in-plane magnetization oscillation in the spin-torque structure. The SOT based head with the spin Hall structure surrounding the spin-torque structure utilizes less current flowed to the spin Hall structure due to the strong SOT generated by the spin Hall structure.

26 Claims, 9 Drawing Sheets

(56) References Cited

U.S. PATENT DOCUMENTS

2015/0287426 A1  10/2015  Mihajlovic et al.

OTHER PUBLICATIONS

Mihajlovic, et al.; Spin Orbit Torque Switching of CoFeB Magnetic Free Layers With Pt and Ta Heavy Metals for SOT MRAM Development; IEEE Magnetics; TMRC 2016; Aug. 17-19, 2016; pp. 53 and 54.

* cited by examiner

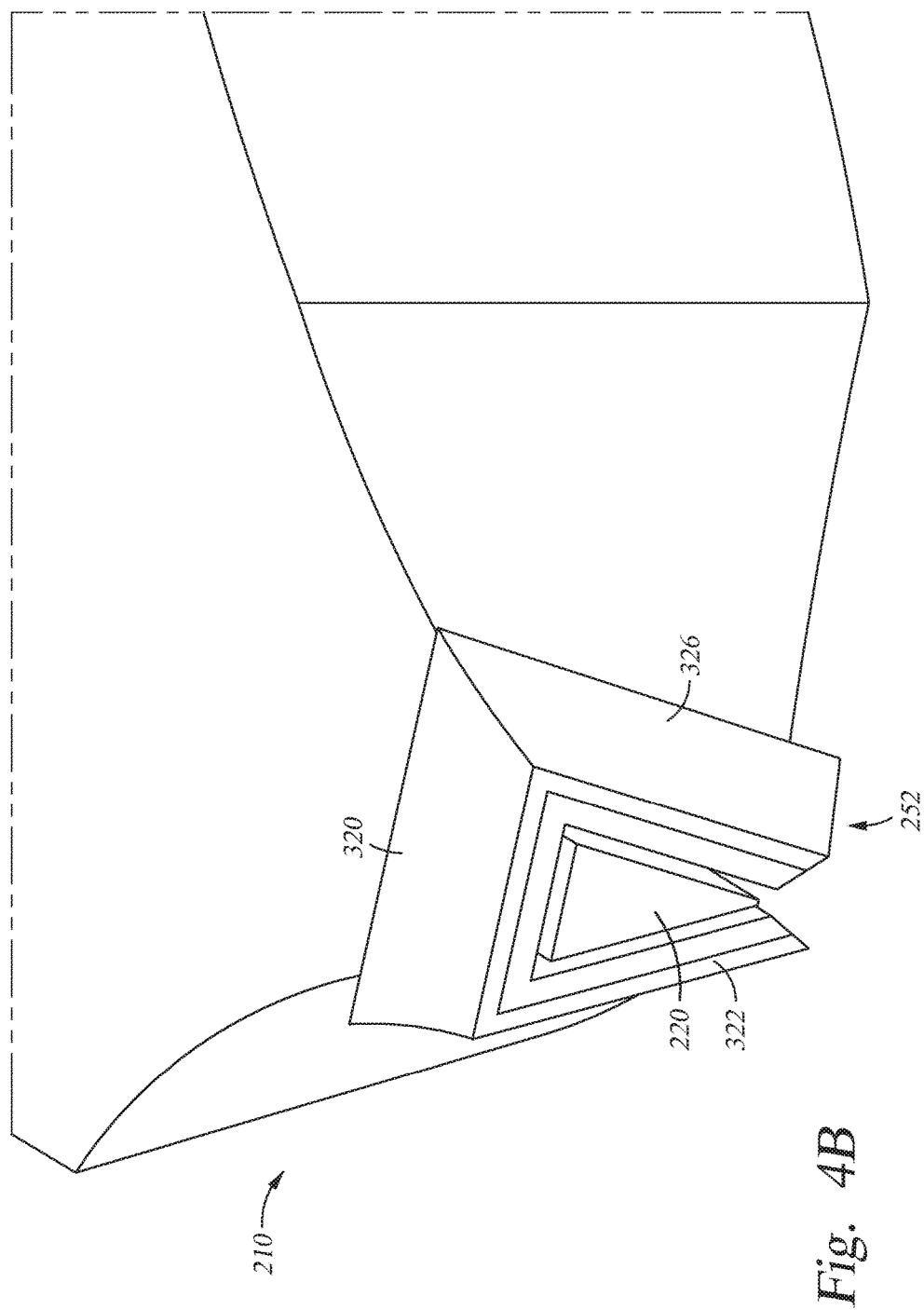

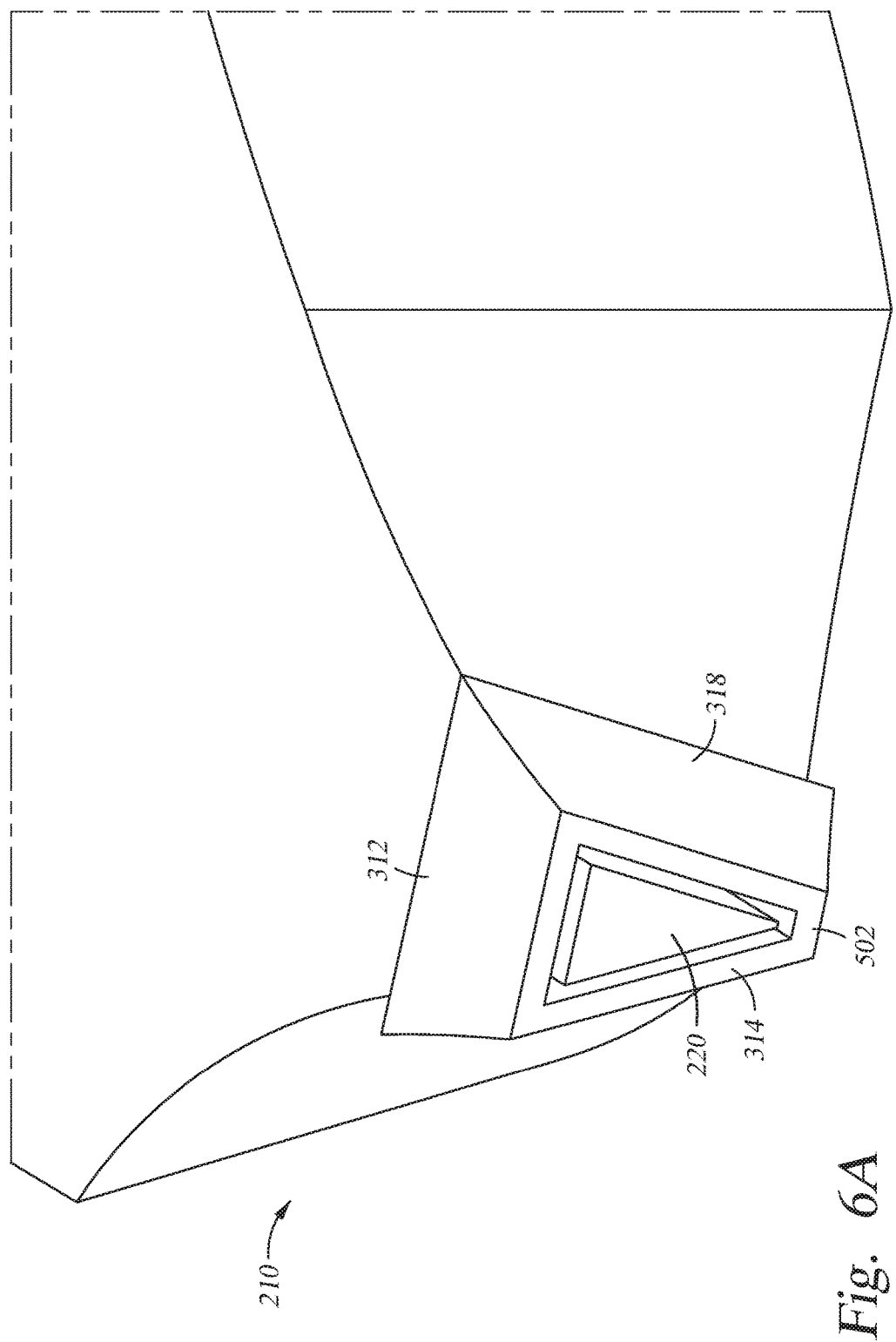

SPIN-ORBIT TORQUE BASED MAGNETIC RECORDING

BACKGROUND

Field of the Disclosure

Embodiments of the present disclosure generally relate to data storage devices, and more specifically, to a magnetic media drive employing a magnetic recording head.

Description of the Related Art

Over the past few years, various magnetic recording methods have been studied to improve the areal density of a magnetic media device, such as a hard disk drive (HDD). For example, microwave assisted magnetic recording (MAMR) utilizes spin-transfer torque (STT), which is generated from a pseudo spin-valve structure. During operation, electrical current flows from the main pole to the trailing shield hot seed layer, and the spin-torque layer magnetization switching (or precession) is induced by the STT.

The pseudo spin-valve structure is difficult to make, and high switching current and voltage ($V_{jump}$) are utilized during its operation, leading to a lower level of energy efficiency.

Therefore, there is a need in the art for an improved data storage device.

SUMMARY OF THE DISCLOSURE

The present disclosure generally relates to data storage devices, and more specifically, to a magnetic media drive employing a magnetic recording head. The head includes a main pole, a spin-torque structure surrounding at least a portion of the main pole at a media facing surface (MFS), and a spin Hall structure surrounding the spin-torque structure. Strong spin-orbit torque (SOT) is generated from the spin Hall structure, enforcing in-plane magnetization oscillation in the spin-torque structure. The SOT based head with the spin Hall structure surrounding the spin-torque structure utilizes less current flowed to the spin Hall structure due to the strong SOT generated by the spin Hall structure.

In one embodiment, a magnetic recording head includes a main pole, a spin-torque structure disposed at a media facing surface, wherein the spin-torque structure faces the main pole, and a spin Hall structure disposed at the media facing surface, wherein the spin Hall structure faces the spin-torque structure.

In another embodiment, a magnetic recording head includes a main pole, a spin-torque structure wrapping around the main pole at a media facing surface, and a spin Hall structure wrapping around the spin-torque structure at the media facing surface.

In another embodiment, a data storage device includes a magnetic write head having a trailing shield hot seed layer, a main pole, a first side shield and a second side shield, wherein the main pole is sandwiched between the first side shield and the second side shield, and a spin Hall structure disposed at a media facing surface.

In another embodiment, a magnetic recording head includes a main pole, means for generating spin-orbit torque, and means for in-plane magnetization oscillation that is enforced by the spin-orbit torque.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4B are perspective views of a portion of the write head of FIG. 2 according to one embodiment.

FIGS. 6A-6B are perspective views of a portion of the write head of FIG. 2 according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to data storage devices, and more specifically, to a magnetic media drive employing a magnetic recording head. The head includes a main pole, a spin-torque structure surrounding at least a portion of the main pole at a MFS, and a spin Hall structure surrounding the spin-torque structure. Strong SOT is generated from the spin Hall structure, enforcing in-plane magnetization oscillation in the spin-torque structure. The SOT based head with the spin Hall structure surrounding the spin-torque structure utilizes less current flowed to the spin Hall structure due to the strong SOT generated by the spin Hall structure.

The terms "over," "under," "between," and "on" as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. Additionally, the relative position of one layer with respect to other layers is provided assuming operations are performed relative to a substrate without consideration of the absolute orientation of the substrate.

Figure 1:
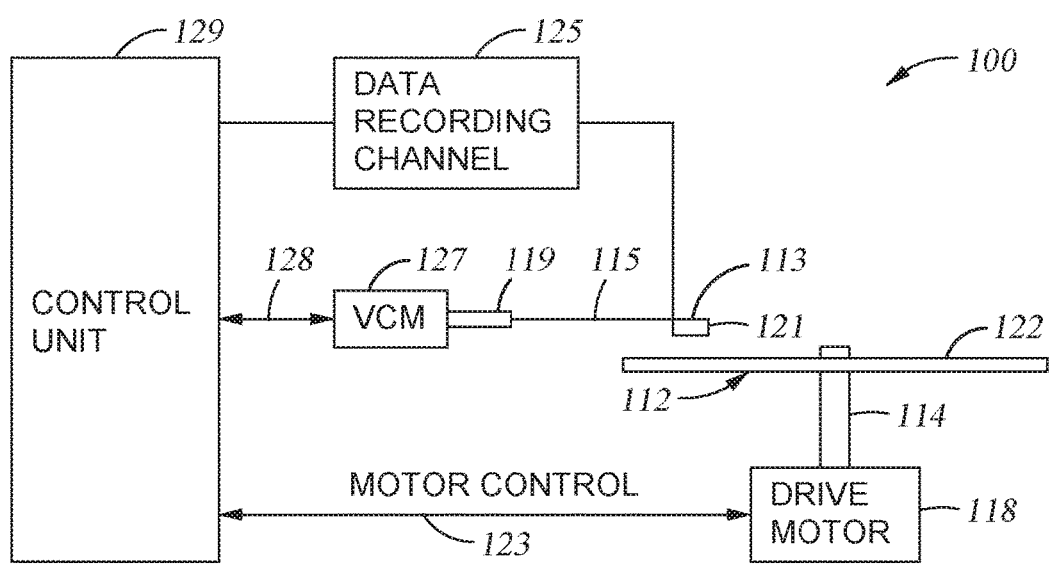
FIG. 1 is a schematic illustration of a magnetic media device according to one embodiment.

FIG. 1 is a schematic illustration of a data storage device such as a magnetic media device. Such a data storage device may be a single drive/device or comprise multiple drives/devices. For the sake of illustration, a single disk drive 100 is shown according to one embodiment. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112, each slider 113 supporting one or more magnetic head assemblies 121 that may include a spin Hall structure for generating SOT. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media device and the accompanying illustration of FIG. 1 are for representation purposes only. It should be apparent that magnetic media devices may contain a large number of media, or disks, and actuators, and each actuator may support a number of sliders.

Figure 2:
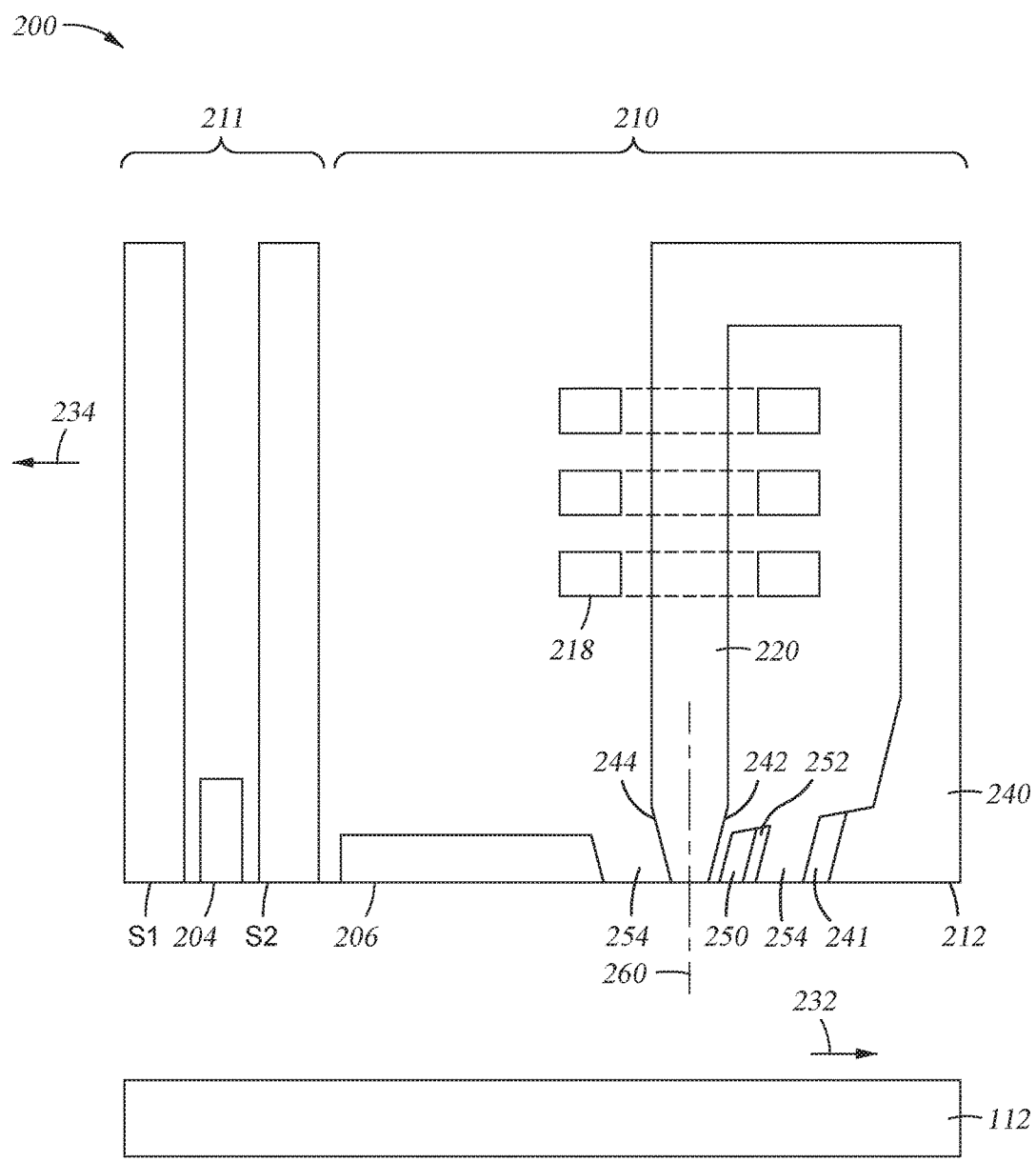
FIG. 2 is a fragmented, cross sectional side view of a read/write head facing a magnetic disk according to one embodiment.

FIG. 2 is a fragmented, cross sectional side view of a read/write head 200 facing the magnetic disk 112 according to one embodiment. The read/write head 200 may correspond to the magnetic head assembly 121 described in FIG. 1. The read/write head 200 includes a MFS 212, such as an air bearing surface (ABS), facing the disk 112, a magnetic write head 210, and a magnetic read head 211. As shown in FIG. 2, the magnetic disk 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic disk 112 are detectable by the MR (or MTJ) sensing element 204 as the recorded bits.

The write head 210 includes a main pole 220, a leading shield 206, a trailing shield 240, a spin-torque structure 250, a spin Hall structure 252, and a coil 218 that excites the main pole 220. The coil 218 may have a "pancake" structure which winds around a back-contact between the main pole 220 and the trailing shield 240, instead of a "helical" structure shown in FIG. 2. The spin-torque structure 250 surrounds at least a portion of the main pole 220 at the MFS 212, and the spin Hall structure 252 surrounds the spin-torque structure 250. A trailing shield hot seed layer 241 is coupled to the trailing shield 240, and the trailing shield hot seed layer 241 faces the spin Hall structure 252. The definition of the term "face" is extended to include a material located between a first element that is facing a second element and the second element. For example, the trailing shield hot seed layer 241 faces the spin Hall structure 252, and a dielectric material 254, such as alumina, is located between the trailing shield hot seed layer 241 and the spin Hall structure 252. The space between the spin-torque structure 250 and the main pole 220 is filled with the dielectric material 254. The dielectric material 254 is also disposed between the leading shield 206 and the main pole 220. The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material such as a FeCo alloy. The leading shield 206 and the trailing shield 240 may be a magnetic material, such as NiFe alloy. The trailing shield hot seed layer 241 may include a high moment sputter material, such as CoFeN or FeXN, where X includes at least one of Rh, Al, Ta, Zr, and Ti.

The spin-torque structure 250 may be a magnetic material, such as a soft magnetic material, for example CoFe alloy, NiFe alloy, CoFeB alloy or half-metals. The spin Hall structure 252 may be a heavy metal, such as beta phase Tantalum (β-Ta), beta phase tungsten (β-W), platinum (Pt), hafnium (Hf), a heavy metal alloy of tungsten with hafnium, iridium, or bismuth doped copper, a topological insulator such as a (Bi,Sb)Te, or antiferromagnetic materials such as MnIr, XMn (X=Fe, Pd, Ir, and Pt) and Cu—Au—I type antiferromagnets. In some embodiments, the spin Hall structure 252 is in direct contact with the spin-torque structure 250. In some embodiments, one or more intervening layers may be disposed between the spin Hall structure 252 and the spin-torque structure 250. During operation, an electrical current flows through the spin Hall structure 252, which has strong spin-orbit coupling, and the spin Hall structure 252 generates SOT. The SOT generated by the spin Hall structure 252 induces magnetization switching (or precession) of the spin-torque structure 250. In some embodiments, the SOT based head has an effective spin injection efficiency (β) of about 0.3 to 0.6, about 2 to 6 times larger than that of a head using a pseudo spin-valve structure (having an effective spin injection efficiency (β) of about 0.1 to 0.3). Higher effective spin injection efficiency leads to reduced critical switching current density, which is defined by the formula:

$$J_{C0} \approx \frac{2e}{\hbar}\mu_0 M_S t\alpha(H_C + M_{eff}/2)/\beta$$

Based on this formula, the 2 to 6 times increase in effective spin injection efficiency (β) for the SOT based head leads to a reduction of the critical switching current density by 2 to 6 times, which in turn brings a higher energy efficiency. Furthermore, the strong SOT generated by the spin Hall structure 252 enforces in-plane magnetization oscillation in the spin-torque structure 250, and the strong SOT utilizes less current flowing through the spin Hall structure 252, leading to improved reliability.

Figure 3:
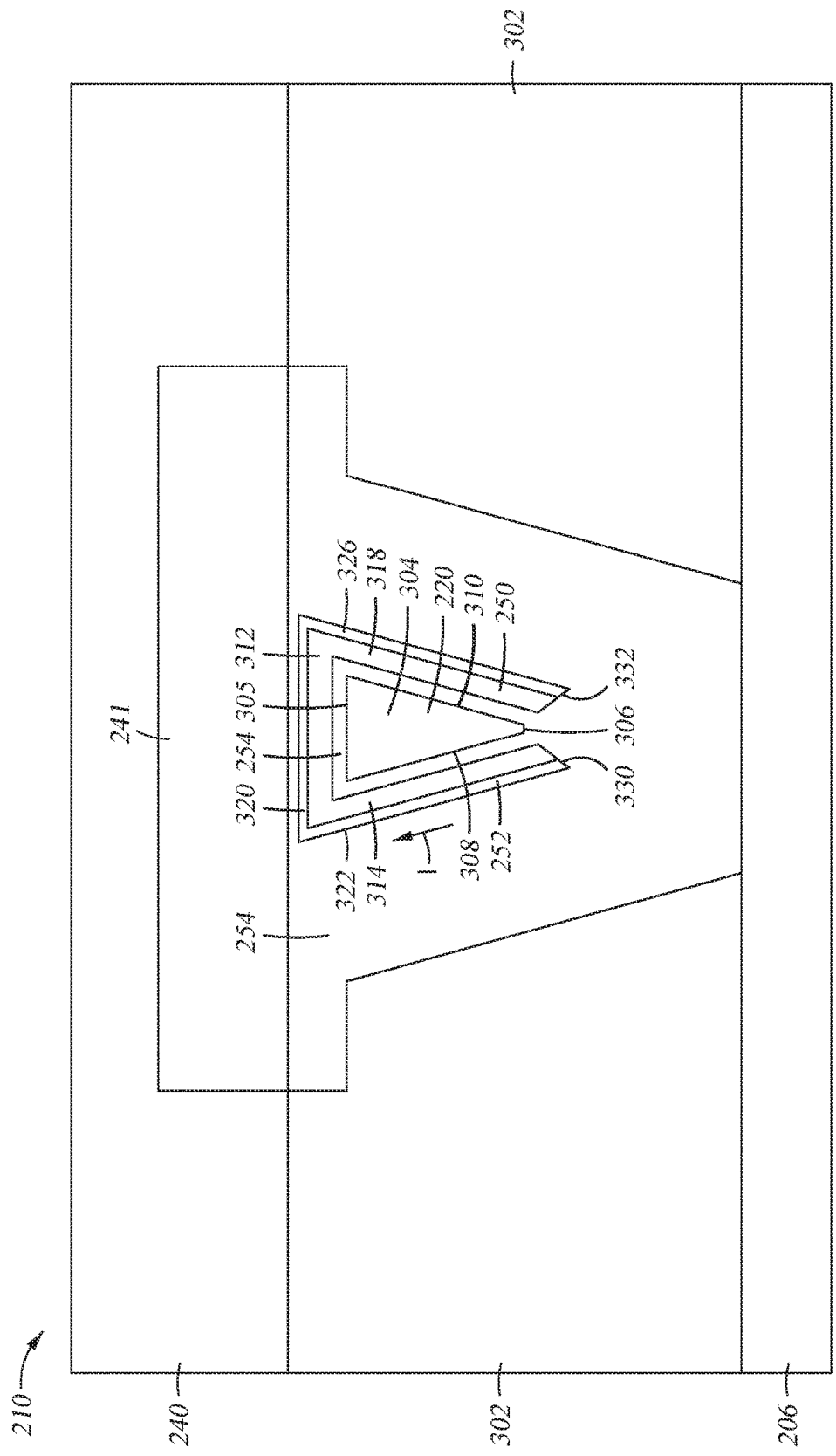
FIG. 3 is a MFS view of a portion of a write head of FIG. 2 according to one embodiment.

FIG. 3 is a MFS view of a portion of the write head 210 of FIG. 2 according to one embodiment. As shown in FIG. 3, the write head 210 includes the trailing shield 240, the trailing shield hot seed layer 241, the main pole 220, and the leading shield 206. The write head 210 further includes side shields 302 sandwiching the main pole 220 along the cross-track direction, as indicated by the Z-axis. The side shields 302 are in direct contact with the leading shield 206 and the trailing shield 240. The side shields 302 are separated from the trailing shield hot seed layer 241 by the dielectric material 254. The side shields 302 may be fabricated from a magnetic material, such as NiFe alloy.

The main pole 220 includes a first surface 304 at the MFS 212, a second surface 305 adjacent the first surface 304, a third surface 306 opposite the second surface 305, a fourth surface 308 connecting the third surface 306 and the second surface 305, and a fifth surface 310 opposite the fourth surface 308. At least a portion of the main pole 220 at the MFS 212 is surrounded by the spin-torque structure 250. In one embodiment, the spin-torque structure 250 surrounds the second, fourth, and fifth surfaces 305, 308, 310 of the main pole 220, as shown in FIG. 3. The third surface 306 of the main pole may not be surrounded by the spin-torque structure 250, and third surface 306 may face the leading shield 206. The dielectric material 254 may be located between the third surface 306 of the main pole and the leading shield 206.

The spin-torque structure 250 is surrounded by the spin Hall structure 252. The spin-torque structure 250 and the spin Hall structure 252 are both located at the MFS 212. The spin-torque structure 250 faces the main pole 220. The spin-torque structure 250 includes a first portion 312, a second portion 314 adjacent the first portion 312, and a third portion 318 opposite the second portion 314. The first portion 312 of the spin-torque structure 250 is disposed between the main pole 220 and the trailing shield hot seed layer 241, the second portion 314 is disposed between the main pole 220 and one of the side shields 302, and the third portion 318 is disposed between the main pole 220 and the other side shield 302. The first portion 312 of the spin-torque structure 250 faces the second surface 305 of the main pole 220 and is substantially parallel to the second surface 305 of the main pole 220. The dielectric material 254 is located between the first portion 312 of the spin-torque structure 250 and the second surface 305 of the main pole 220. The second portion 314 of the spin-torque structure 250 faces the fourth surface 308 of the main pole 220 and is substantially parallel to the fourth surface 308 of the main pole 220. The dielectric material 254 is located between the second portion 314 of the spin-torque structure 250 and the fourth surface 308 of the main pole 220. The third portion 318 of the spin-torque structure 250 faces the fifth surface 310 of the main pole 220 and is substantially parallel to the fifth surface 310 of the main pole 220. The dielectric material 254 is located between the third portion 318 of the spin-torque structure 250 and the fifth surface 310 of the main pole 220.

The spin Hall structure 252 faces the spin-torque structure 250. The spin Hall structure 252 includes a first portion 320, a second portion 322 adjacent the first portion 320, and a third portion 326 opposite the second portion 322. The first portion 320 is disposed between the first portion 312 of the spin-torque structure 250 and the trailing shield hot seed layer 241, the second portion 322 is disposed between the second portion 314 of the spin-torque structure 250 and one of the side shields 302, and the third portion 326 is disposed between the third portion 318 of the spin-torque structure 250 and the other side shield 302. The first portion 320 faces the first portion 312 of the spin-torque structure 250, the second portion 322 faces the second portion 314 of the spin-torque structure 250, and the third portion 326 faces the third portion 318 of the spin-torque structure 250. In one embodiment, the spin Hall structure 252 is fabricated from Pt, which has an electrical resistivity relatively similar to the soft magnetic material of the spin-torque structure 250. When the electrical resistivity of the spin Hall structure 252 is relatively similar to the electrical resistivity of the spin-torque structure 250, the spin Hall structure 252 is in direct contact with the spin-torque structure 250. For example, the first portion 320 of the spin Hall structure 252 is in direct contact with the first portion 312 of the spin-torque structure 250, the second portion 322 of the spin Hall structure 252 is in direct contact with the second portion 314 of the spin-torque structure 250, and the third portion 326 of the spin Hall structure 252 is in direct contact with the third portion 318 of the spin-torque structure 250. In some embodiments, the electrical resistivity of the spin Hall structure 252 is substantially greater than the electrical resistivity of the spin-torque structure 250, and an insulating layer may be inserted between the spin Hall structure 252 and the spin-torque structure 250. The insulating layer is described in detail in FIG. 7.

The first portion 312 of the spin-torque structure 250 has a thickness along the X-axis, a length along the Z-axis, and a width along the Y-axis. The second portion 314 and the third portion 318 of the spin-torque structure 250 each has a thickness along the Z-axis, a length along the X-axis, and a width along the Y-axis. The first portion 320 of the spin Hall structure 252 has a thickness along the X-axis, a length along the Z-axis, and a width along the Y-axis. The second portion 322 and the third portion 326 of the spin Hall structure 252 each has a thickness along the Z-axis, a length along the X-axis, and a width along the Y-axis. Widths of portions 320, 322, 326 of the spin Hall structure 252 may be substantially the same as corresponding widths of portions 312, 314, 318 of the spin-torque structure 250. Lengths of portions 320, 322, 326 of the spin Hall structure 252 may be greater than corresponding Lengths of portions 312, 314, 318 of the spin-torque structure 250. The minimum thickness of portions 320, 322, 326 of the spin Hall structure 252 may depend on the spin diffusion length of the material that is used to fabricate the spin Hall structure 252. Thicknesses of portions 320, 322, 326 of the spin Hall structure 252 may be substantially the same, such as from about 5 nm to about 50 nm. The thickness of the portion 320 may be substantially less than thicknesses of portions 322 and 326. Thicknesses of portions 312, 314, 318 of the spin-torque structure 250 may be substantially the same, such as from about 8 nm to about 30 nm. The thickness of the portion 312 may be substantially different from thicknesses of portions 314 and 318. Thicknesses of portions 320, 322, 326 of the spin Hall structure 252 may be the same as, less than, or greater than corresponding thicknesses of portions 312, 314, 318 of the spin-torque structure 250.

During operation, an electrical current (I) flows from the preamp (not shown) to a first end 330 of the spin Hall structure 252 via a first lead (not shown), and the electrical current (I) flows through the spin Hall structure 252 in a clockwise direction, as shown in FIG. 3. The electrical current (I) exits the spin Hall structure 252 at a second end 332 of the spin Hall structure 252, and the second end 332 of the spin Hall structure 252 may be connected to a second lead (not shown), which is electrically connected to the preamp (not shown).

Figure 4A:
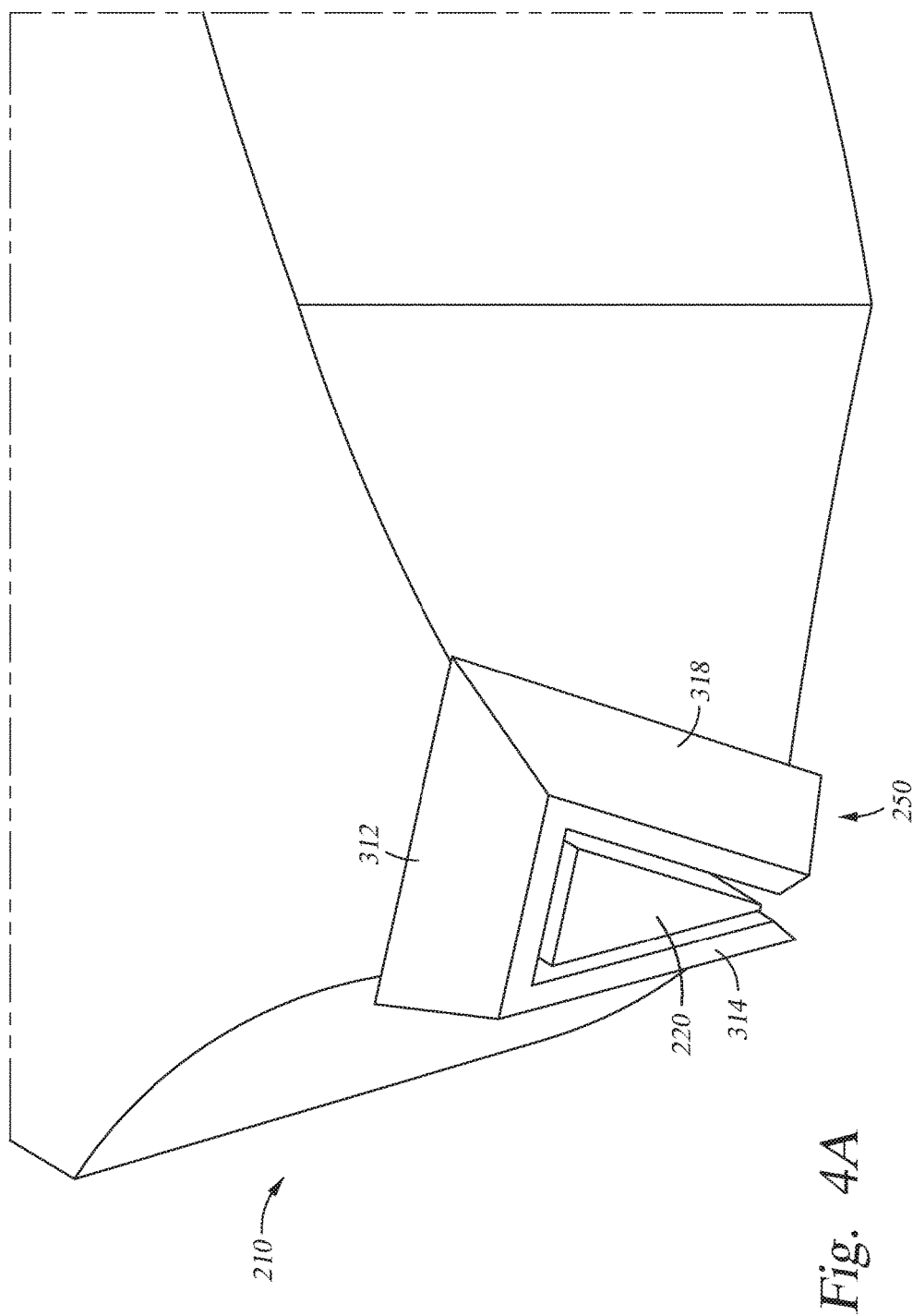

FIGS. 4A and 4B are perspective views of a portion of the write head 210 of FIG. 2 according to one embodiment. The spin Hall structure 252 is omitted in FIG. 4A for better illustration of the spin-torque structure 250. As shown in FIG. 4A, the write head 210 includes the main pole 220 and the spin-torque structure 250 surrounding at least a portion of the main pole 220. The spin-torque structure 250 includes the first portion 312, the second portion 314, and the third portion 318. As shown in FIG. 4B, the write head 210 further includes the spin Hall structure 252 surrounding the spin-torque structure 250. The spin Hall structure 252 includes the first portion 320, the second portion 322, and the third portion 326. As shown in FIG. 4B, as the electrical current I flows through the spin Hall structure 252, a strong SOT is generated. The strong SOT enforces in-plane magnetization oscillation in the spin-torque structure 250, as shown in FIG. 4A. The in-plane magnetization oscillation provides an AC magnetic field to the recording medium, such as the magnetic disk 112 (as shown in FIG. 2), in which a radio frequency (RF) field generated by the SOT induces magnetization switching, thus high quality recording is achieved.

Figure 5:
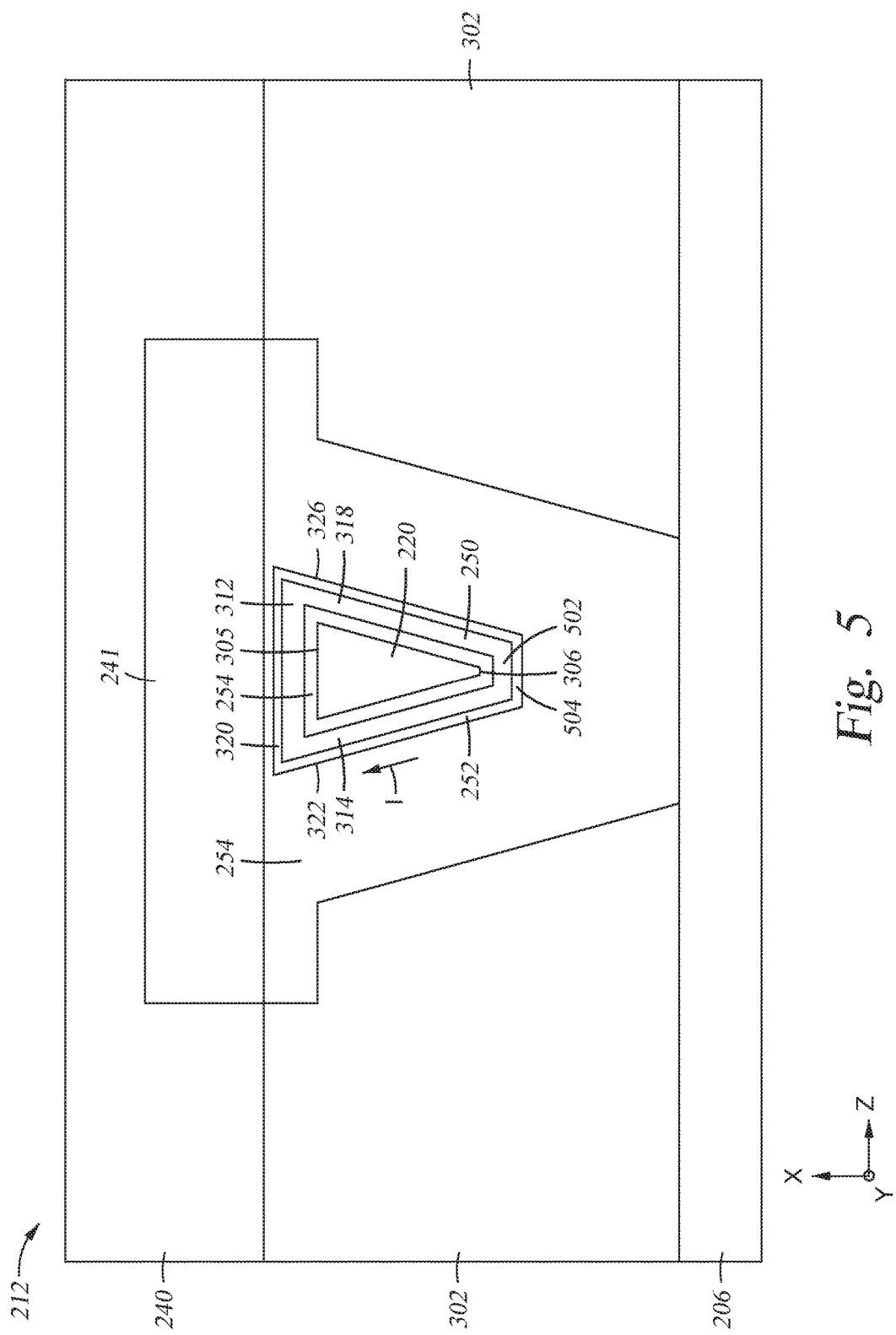
FIG. 5 is a MFS view of a portion of a write head of FIG. 2 according to one embodiment.

FIG. 5 is a MFS view of a portion of the write head 210 of FIG. 2 according to one embodiment. As shown in FIG. 5, the write head 210 includes the trailing shield 240, the trailing shield hot seed layer 241, the main pole 220, the leading shield 206, and the side shields 302. The main pole 220 includes the first surface 304, the second surface 305, the third surface 306, the fourth surface 308, and the fifth surface 310. The spin-torque structure 250 includes the first portion 312, the second portion 314, the third portion 318, and the fourth portion 502 opposite the first portion 312. The fourth portion 502 of the spin-torque structure 250 faces the third surface 306 of the main pole 220 and is substantially parallel to the third surface 306 of the main pole 220. The fourth portion 502 is disposed between the main pole and the leading shield 206. The spin-torque structure 250 forms a continuous loop that wraps around the main pole 220, as shown in FIG. 5. The definition of the term "wrap around" is extended to include having a material located between the element that is wrapping around and the element that is being wrapped around. In other words, a material may be located between a first element and a second element, and the first element wraps around the second element. For example, the dielectric material 254 may be located between the portions 312, 314, 318, 502 of the spin-torque structure 250 and corresponding surfaces 305, 308, 310, 306 of the main pole 220, and the spin-torque structure 250 wraps around surfaces 305, 308, 310, 306 of the main pole 220.

The spin Hall structure 252 includes the first portion 320, the second portion 322, the third portion 326, and a fourth portion 504 opposite the first portion 320. The fourth portion 504 of the spin Hall structure 252 may be in direct contact with the fourth portion 502 of the spin-torque structure 250. Alternatively, an insulating layer may be located between the fourth portion 504 of the spin Hall structure 252 and the fourth portion 502 of the spin-torque structure 250. The fourth portion 504 is disposed between the fourth portion 502 of the spin-torque structure 250 and the leading shield 206. The spin Hall structure 252 forms a continuous loop that wraps around the spin-torque structure 250, as shown in FIG. 5.

The fourth portion 502 of the spin-torque structure 250 has a thickness along the X-axis, a length along the Z-axis, and a width along the Y-axis. The fourth portion 504 of the spin Hall structure 252 has a thickness along the X-axis, a length along the Z-axis, and a width along the Y-axis. The length of the fourth portion 502 of the spin-torque structure 250 may be less than the length of the fourth portion 504 of the spin Hall structure 252. The thickness of the fourth portion 504 of the spin Hall structure 252 may be the substantially the same as the thicknesses of portions 320, 322, 326 of the spin Hall structure 252. The thickness of the fourth portion 502 of the spin-torque structure 250 may be substantially the same as the thicknesses of portions 312, 314, 318 of the spin-torque structure 250. Thicknesses of portions 320, 322, 326, 504 of the spin Hall structure 252 may be the same as, less than, or greater than corresponding thicknesses of portions 312, 314, 318, 502 of the spin-torque structure 250.

During operation, an electrical current (I) flows from the preamp (not shown) to a first location of the spin Hall structure 252 via a first lead (not shown), and the electrical current (I) flows through the spin Hall structure 252 in a clockwise direction, as shown in FIG. 5. The electrical current (I) exits the spin Hall structure 252 at a second location of the spin Hall structure 252 via a second lead (not shown), which is electrically connected to the preamp (not shown). In one embodiment, the first lead is connected to the fourth portion 504 of the spin Hall structure 252, and second lead is connected to the first portion 320 of the spin Hall structure 252.

Figure 6B:
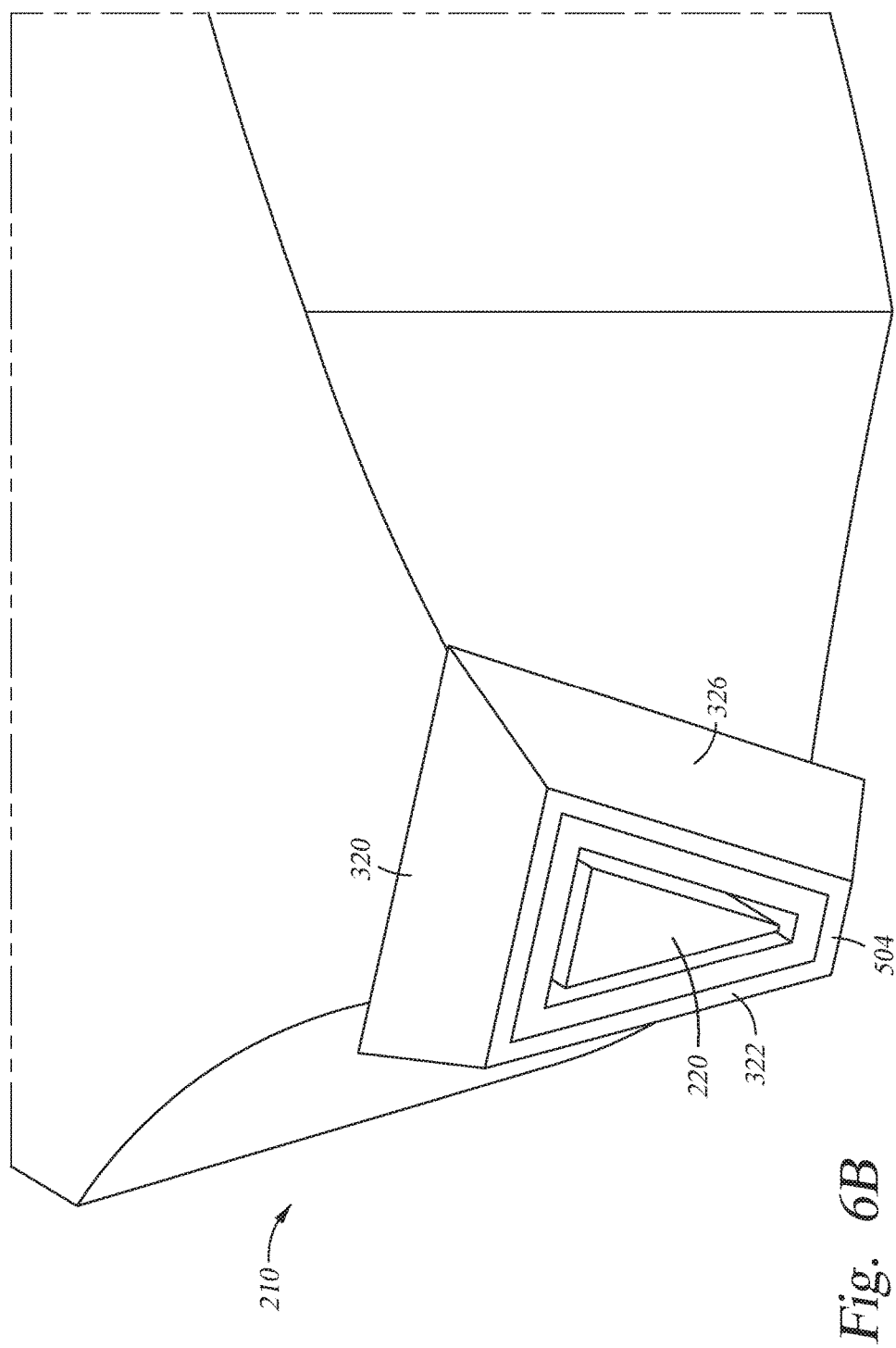

FIGS. 6A and 6B are perspective views of a portion of the write head 210 of FIG. 2 according to one embodiment. The spin Hall structure 252 is omitted in FIG. 6A for better illustration of the spin-torque structure 250. As shown in FIG. 6A, the write head 210 includes the main pole 220 and the spin-torque structure 250 wrapping around the main pole 220. The spin-torque structure 250 includes the first portion 312, the second portion 314, the third portion 318, and the fourth portion 502. As shown in FIG. 6B, the write head 210 further includes the spin Hall structure 252 wrapping around the spin-torque structure 250. The spin Hall structure 252 includes the first portion 320, the second portion 322, the third portion 326, and the fourth portion 504. As shown in FIG. 6B, as the electrical current I flows through the spin Hall structure 252, a strong SOT is generated. The strong SOT enforces in-plane magnetization oscillation in the spin-torque structure 250, as shown in FIG. 6A.

Figure 7:
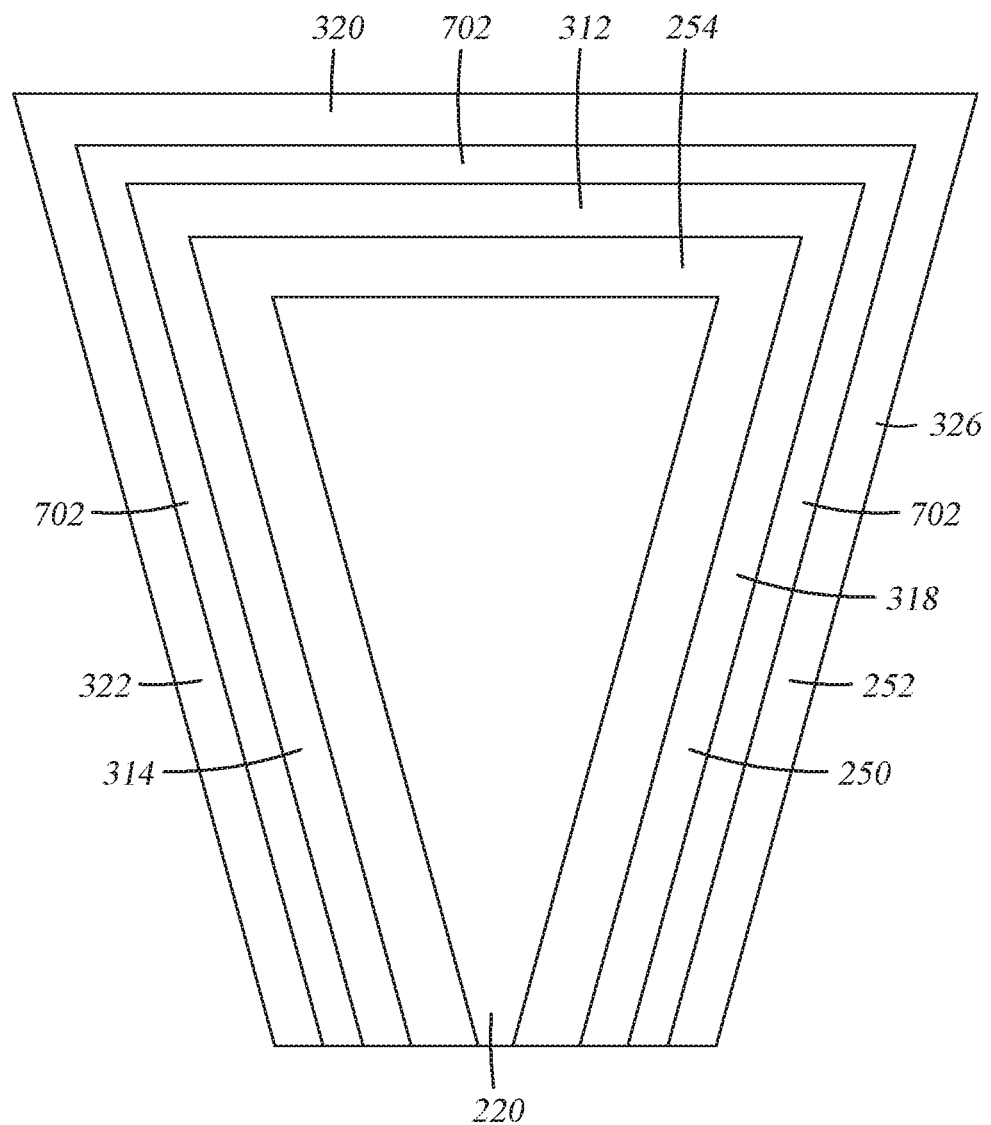
FIG. 7 is a MFS view of a portion of the write head of FIG. 2 according to one embodiment.

FIG. 7 is a MFS view of a portion of the write head 210 of FIG. 2 according to one embodiment. As shown in FIG. 7, an insulating layer 702 is located between the spin-torque structure 250 and the spin Hall structure 252. The insulating layer 702 may be fabricated from an electrical insulating material, such as magnesium oxide (MgO) or alumina. The insulating layer 702 may have a thickness ranging from about 2 Angstroms to about 5 Angstroms. The insulating layer 702 is utilized when the electrical resistivity of the spin Hall structure 252 is greater than the electrical resistivity of the spin-torque structure 250.

The benefits of having a SOT based head is that the spin polarization ratio of the SOT based head is about 2 to 6 times larger than that of a head using a pseudo spin-valve structure, reducing the critical switching current density by 2 to 6 times. As a result of the reduced critical switching current density, the SOT based head has a higher energy efficiency, such as about 2 to 6 times less energy used than that of a head using a pseudo spin-valve structure. Furthermore, the spin Hall structure surrounds the spin-torque structure and generates a strong SOT. The strong SOT generated by the spin Hall structure enforces in-plane magnetization oscillation in the spin-torque structure. The SOT based head with the spin Hall structure surrounding the spin-torque structure utilizes less current flowed to the spin Hall structure due to the strong SOT generated by the spin Hall structure.

While the foregoing is directed to embodiments of the present disclosure, other and further embodiments of the disclosure may be devised without departing from the basic scope thereof, and the scope thereof is determined by the claims that follow.

The invention claimed is:

1. A magnetic recording head, comprising:
a main pole;
a spin-torque structure disposed at a media facing surface, wherein the spin-torque structure faces the main pole; and
a spin Hall structure disposed at the media facing surface, wherein the spin Hall structure faces the spin-torque structure.

2. The magnetic recording head of claim 1, wherein the spin Hall structure comprises a material selected from the group consisting of beta phase Tantalum, beta phase tungsten, platinum, hafnium, an alloy of tungsten with hafnium, iridium, or bismuth doped copper, (Bi,Sb)Te, MnIr, XMn (X=Fe, Pd, Ir, and Pt), and antiferromagnets.

3. The magnetic recording head of claim 1, wherein the spin-torque structure comprises a magnetic material.

4. The magnetic recording head of claim 1, wherein the main pole comprises a first surface at the media facing surface, a second surface adjacent the first surface, a third surface opposite the second surface, a fourth surface connecting the second surface and the third surface, and a fifth surface opposite the fourth surface.

5. The magnetic recording head of claim 4, wherein the spin-torque structure comprises a first portion facing the second surface of the main pole, a second portion connected to the first portion, and a third portion opposite the second portion.

6. The magnetic recording head of claim 5, wherein the second portion of the spin-torque structure faces the fourth surface of the main pole, and the third portion of the spin-torque structure faces the fifth surface of the main pole.

7. The magnetic recording head of claim 5, wherein the first portion of the spin-torque structure is substantially parallel to the second surface of the main pole, the second portion of the spin-torque structure is substantially parallel to the fourth surface of the main pole, and the third portion of the spin-torque structure is substantially parallel to the fifth surface of the main pole.

8. The magnetic recording head of claim 5, wherein the spin Hall structure comprises a first portion disposed between the first portion of the spin-torque structure and a trailing shield hot seed layer, a second portion connected to the first portion, and a third portion opposite the second portion.

9. The magnetic recording head of claim 8, wherein the first portion of the spin-torque structure is in direct contact with the first portion of the spin Hall structure, the second portion of the spin-torque structure is in direct contact with the second portion of the spin Hall structure, and the third portion of the spin-torque structure is in direct contact with the third portion of the spin Hall structure.

10. The magnetic recording head of claim 1, further comprising a dielectric material disposed between the spin-torque structure and the main pole.

11. A magnetic recording head, comprising:
a main pole;
a spin-torque structure wrapping around the main pole at a media facing surface; and
a spin Hall structure wrapping around the spin-torque structure at the media facing surface.

12. The magnetic recording head of claim 11, wherein the spin-torque structure is in direct contact with the spin Hall structure.

13. The magnetic recording head of claim 11, further comprising an insulating layer disposed between the spin-torque structure and the spin Hall structure.

14. The magnetic recording head of claim 11, wherein the spin Hall structure comprises a material selected from the group consisting of beta phase Tantalum, beta phase tungsten, platinum, hafnium, an alloy of tungsten with hafnium, iridium, or bismuth doped copper, (Bi,Sb)Te, MnIr, XMn (X=Fe, Pd, Ir, and Pt), and antiferromagnets.

15. The magnetic recording head of claim 11, wherein the main pole comprises a first surface at the media facing surface, a second surface adjacent the first surface, a third surface opposite the second surface, a fourth surface connecting the second surface and the third surface, and a fifth surface opposite the fourth surface.

16. The magnetic recording head of claim 15, wherein the spin-torque structure wraps around the second surface, third surface, fourth surface, and fifth surface of the main pole.

17. A data storage device, comprising:
a magnetic write head, comprising:
a trailing shield hot seed layer;
a main pole;
a first side shield and a second side shield, wherein the main pole is sandwiched between the first side shield and the second side shield;
a spin Hall structure disposed at a media facing surface; and
a spin-torque structure disposed at the media facing surface, wherein the spin-torque structure includes a first portion disposed between the trailing shield hot seed layer and the main pole, a second portion disposed between the main pole and the first side shield, and a third portion disposed between the main pole and the second side shield.

18. The data storage device of claim 17, wherein the spin Hall structure comprises a first portion disposed between the first portion of the spin-torque structure and the trailing shield hot seed layer, a second portion disposed between the second portion of the spin-torque structure and the first side shield, and a third portion disposed between the third portion of the spin-torque structure and the second side shield.

19. A data storage device, comprising:
a magnetic write head, comprising:
a trailing shield hot seed layer;
a main pole;
a first side shield and a second side shield, wherein the main pole is sandwiched between the first side shield and the second side shield;
a spin Hall structure disposed at a media facing surface; and
a spin-torque structure, wherein the spin-torque structure surrounds at least a portion of the main pole.

20. The data storage device of claim 19, wherein the spin Hall structure surrounds the spin-torque structure.

21. The data storage device of claim 19, further comprising an insulating layer disposed between the spin-torque structure and the spin Hall structure.

22. The data storage device of claim 21, wherein the insulating layer comprising a material selected from the group consisting of magnesium oxide and alumina.

23. A magnetic recording head, comprising:
a main pole;
means for generating spin-orbit torque; and
means for in-plane magnetization oscillation that is enforced by the spin-orbit torque.

24. The magnetic recording head of claim 23, wherein the means for generating spin-orbit torque is disposed at a media facing surface.

25. The magnetic recording head of claim 23, wherein the means for in-plane magnetization oscillation is disposed at a media facing surface.

26. The magnetic recording head of claim 23, further comprising an insulating layer disposed between the means for generating spin-orbit torque and means for in-plane magnetization oscillation.

* * * * *